March 22, 1960   R. L. PIERCE   2,929,598
MOUNTING FRAME FOR WHEEL BALANCERS
Filed Feb. 21, 1958
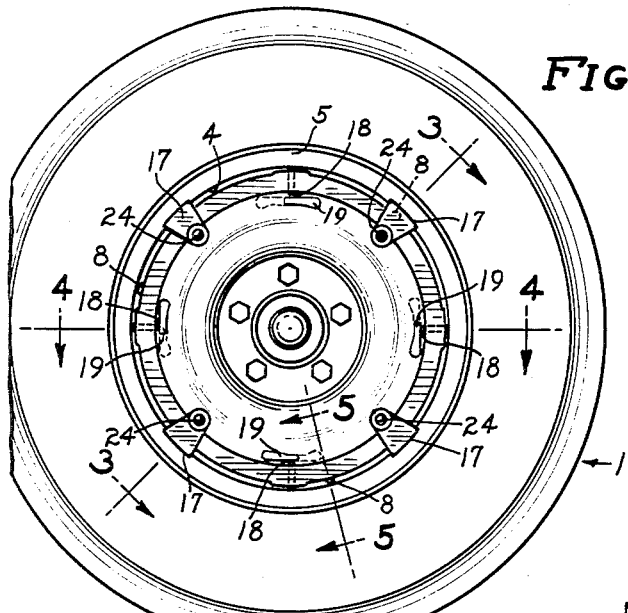
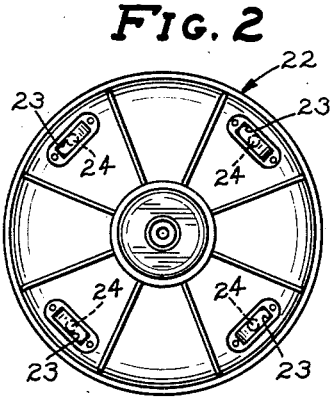
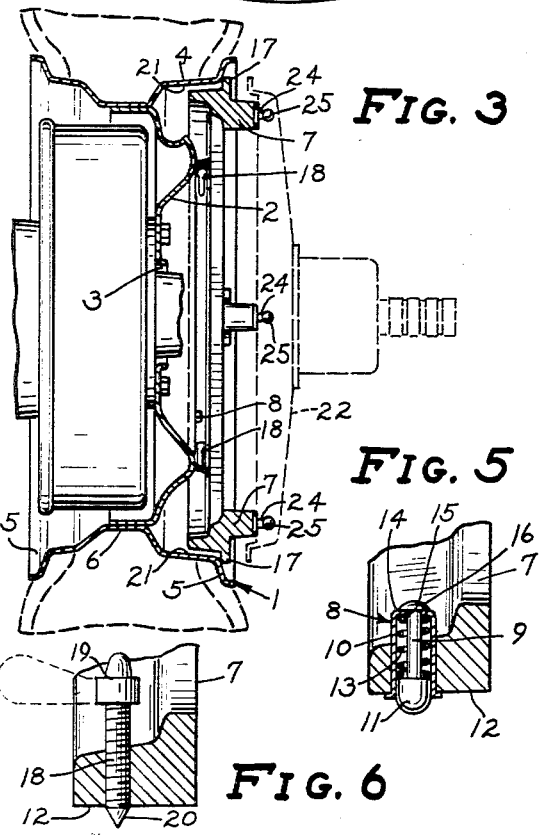
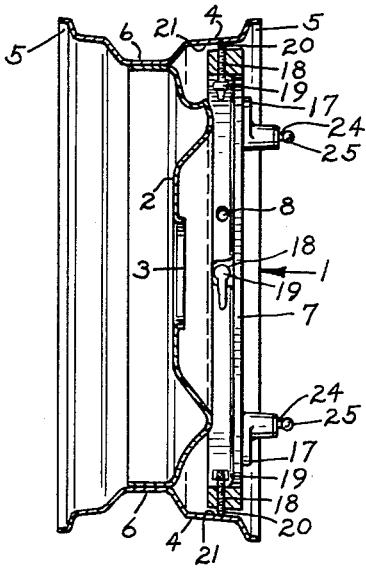
INVENTOR.
RAYMOND L. PIERCE
BY
*Merchant & Merchant*
ATTORNEYS United States Patent Office 2,929,598
Patented Mar. 22, 1960

2,929,598

MOUNTING FRAME FOR WHEEL BALANCERS

Raymond L. Pierce, Mound, Minn., assignor to Tru-Bal Products, Inc., Mound, Minn., a corporation of Minnesota Application February 21, 1958, Serial No. 716,601

3 Claims. (Cl. 248—205)

My invention relates to mechanism for the balancing of conventional wheels for automotive vehicles and the like and more particularly to a novel mounting device for conventional wheel balancers of the dynamic type.

The primary object of my invention is the provision of a self-centering annular mounting frame which may be quickly and effortlessly positioned in engagement with the radially inner surface of the cylindrical felly band portion of a conventional automotive vehicle wheel, and which is provided with means for securely anchoring said frame in said centered relationship during attachment thereto of a conventional disc-like wheel balancer of the dynamic type, and during the wheel balancing operation.

A further object of my invention is the provision of a device of the class above described which is inexpensive to produce, is trouble-free in its operation, and is extremely easy to attach and detach.

A further object of my invention is the provision of a device of the class above described which may be attached to and detached from a conventional wheel of an automotive vehicle without impairing the function or appearance of said wheel.

The above and still further objects of my invention will become apparent from the following detailed specification, appended claims and attached drawings.

Referring to the drawings wherein like characters indicate like parts throughout the several views:

Fig. 1 is a view in side elevation of a conventional automotive vehicle wheel with my novel mounting frame attached thereto;

Fig. 2 is a view in side elevation of a conventional wheel balancer of the dynamic type;

Fig. 3 is a view in section as seen from the line 3—3 of Fig. 1;

Fig. 4 is a view in section as seen from the line 4—4 of Fig. 1;

Fig. 5 is an enlarged fragmentary view in section as seen substantially from the line 5—5 of Fig. 1; and Fig. 6 is an enlarged fragmentary detail of a portion of Fig. 4.

Referring with greater particularity to the drawings, the numeral 1 indicates in its entirety a conventional pneumatic tire vehicle wheel formed from sheet steel or the like and comprising a disc-like body 2 having a central opening 3 therein, and a generally cylindrical felly band portion 4 projecting axially outwardly in opposite directions from the body 2. Felly band portion 4 is shown as having radially outwardly projecting bead engaging flanges 5 at its opposite sides and a radially inwardly depressed, drop center 6.

My novel mounting device comprises an annular frame 7, preferably formed from cast aluminum or the like, and having an external diameter slightly less than the internal diameter of the felly band portion 4 of a wheel 1 to which it is adapted to be attached so as to be loosely received within the felly band 4 as illustrated in Fig. 3. As shown particularly by Figs. 1 and 5, the annular frame 7 is provided with a plurality of circumferentially spaced centering elements, identified in their entireties by the numeral 8 and each comprising a radially extended plunger 9 received within cups 10, said plungers 9 having enlarged heads 11 at their radially outer ends which are yieldingly biased radially outwardly of the radially outer surface 12 of the frame 7 by means of coil compression springs 13 also received within the cups 10 in encompassing relationship with the plungers 9 and interposed between the enlarged heads 11 and the bottoms or radially inner surfaces 14 of the cups 10. As shown in Fig. 5, the plungers 9 work through openings 15 in the bottoms 14 of the cups 10. The plungers 9 have their extreme radially inner ends enlarged as indicated at 16 so as to limit radially outward movements of the heads 11 beyond the position shown in Fig. 5.

As the frame 7 is placed within the felly band portion 4 of a wheel 1, each of the heads 11 is depressed somewhat against the yielding bias of its cooperating spring 13 and in this manner the frame 7 is caused to assume a concentric relationship with the wheel 1 and felly band portion 4 thereof. With reference to Figs. 1 and 3, it will be noted that the frame 7 is provided with stop means in the nature of radially outwardly projecting ears 17 which, by engagement with the axially outer portions of the felly band portion 4, limit axially inward movements of said frame 7 with respect to said wheel 1.

Circumferentially staggered with respect to the centering elements 8 and projecting radially through the frame 7 are circumferentially equally spaced locking screws 18 (preferably opposed pairs) having laterally projecting handles 19 on their radially inner ends and pointed tips 20 on their radially outer ends adapted to become imbedded in the metallic radially inner surface 21 of the felly band portion 4. The cooperating threads on the locking screws 18 and radially extended apertures (not specifically numbered) on the frame 7 in which said screws are received, are of the rapid take-up type so as to rapidly advance the locking screws 18 when rotated but a half turn from their dotted inoperative positions of Fig. 1 to their operative clamping full line positions thereof. Furthermore, great care is taken to assure that the pointed ends 20 are equi-distantly spaced from the periphery of the frame 7 in all similar positions of movement of the handle 19. For instance, when the pointed ends 20 of the several locking screws 18 are flush with the peripheral surface of the frame 7, all of the handles 19 will be parallel to each other; and this parallelity will be maintained as rotary clamping movement is imparted to the handles 19. Preferably and as shown, the handles 19 will lie within the plane of the frame 7 when moved one-half turn from their dotted line inoperative to their full line operative positions.

In operation, a mounting frame 7 for a given sized wheel 1 is initially placed in position as shown in Fig. 3 with the centering elements in spring pressed engagement with the radially inner surface 21 of the felly band portion 4 and with the ears 17 in engagement with the axially outer limits of the felly band portion 4. The initial concentric relationship established by the centering elements 8 between the frame 7 and the wheel 1 is maintained as each of the handles 19 is swung from the dotted to full line positions of Fig. 1. With my novel frame 7 thus securely locked in operative concentric relationship with and to the wheel 1, it is but necessary to detachably secure thereto a conventional disc-like wheel balancer of the conventional type, as shown in Fig. 2, and which is identified in its entirety by the numeral 22. As shown, the balancer 22 is provided with circumferentially spaced apertures 23 adapted to detachably receive one each of the axially outwardly projecting circumferentially spaced locking pins 24 carried by the frame 7. As shown, the locking pins 24 are provided with enlarged heads 25 which facilitate clamping by conventional mechanism, not illustrated.

My invention has been thoroughly tested and found to be completely satisfactory for the accomplishment of the above objects and while I have shown a preferred embodiment thereof, I wish it to be specifically understood that same is capable of modification without departure from the scope and spirit of the appended claims.

What I claim is:

1. A mounting device for balancers for use on wheels of the type including a disc-like body and a generally cylindrical felly band portion projecting axially from said body, said mounting device comprising an annular frame having an external diameter only slightly less than the internal diameter of said felly band and receivable in part within said felly band, a plurality of substantially uniformly yieldingly biased circumferentially spaced centering elements carried by said frame and adapted to engage the radially inner surface of said felly band portion, stop means on said frame engageable with said wheel to limit axially inward movements of said frame with respect to said wheel, a plurality of equally circumferentially spaced locking screws extending radially through said frame and engageable with the radially inner surface of said felly band portion to positively lock said frame against axially outer movements, and means on said frame for detachably mounting a circular wheel balancer thereon in concentric relation therewith.

2. The structure defined in claim 1 in which said locking screws are provided with laterally projecting handles radially inwardly of said frame, said handles all lying within the plane of said frame in their inoperative positions and also when rotated one-half turn to their operative locking positions.

3. The structure defined in claim 1 in which the arrangement between the threads of the locking screws and the points thereof is such that when all of said points are flush with the outer peripheral surface of said frame, said handles will be parallel to each other and will maintain said parallelism during equal advancement of said locking screws.

References Cited in the file of this patent

UNITED STATES PATENTS 2,779,196     Hemmeter _____ Jan. 29, 1957

FOREIGN PATENTS 746,520     Great Britain _____ Mar. 14, 1956